US012806708B2

(12) United States Patent
Kim et al.

(10) Patent No.: US 12,806,708 B2
(45) Date of Patent: Nov. 24, 2026

(54) METHOD FOR MANUFACTURING WELDED STRUCTURE, AND WELDED STRUCTURE MANUFACTURED THEREBY

(71) Applicant: POSCO, Pohang-si (KR)

(72) Inventors: Young-Ha Kim, Gwangyang-si (KR); Chang-Sik Choi, Gwangyang-si (KR); Ki-Hyun Park, Gwangyang-si (KR)

(73) Assignee: POSCO, Pohang-si (KR)

( * ) Notice: Subject to any disclaimer, the term of this patent is extended or adjusted under 35 U.S.C. 154(b) by 996 days.

(21) Appl. No.: 17/780,180

(22) PCT Filed: Nov. 25, 2020

(86) PCT No.: PCT/KR2020/016844
§ 371 (c)(1),
(2) Date: May 26, 2022

(87) PCT Pub. No.: WO2021/112480
PCT Pub. Date: Jun. 10, 2021

(65) Prior Publication Data
US 2022/0410303 A1 Dec. 29, 2022

(30) Foreign Application Priority Data
Dec. 6, 2019 (KR) ........................ 10-2019-0162009

(51) Int. Cl.
*B23K 11/16* (2006.01)
*B23K 11/11* (2006.01)
(Continued)

(52) U.S. Cl.
CPC ........... *B23K 11/166* (2013.01); *B23K 11/115* (2013.01); *B23K 11/20* (2013.01);
(Continued)

(58) Field of Classification Search
CPC ..... B23K 11/115; B23K 11/166; B23K 11/20; B23K 11/34; B23K 2101/34;
(Continued)

(56) References Cited

U.S. PATENT DOCUMENTS

2008/0241572 A1 10/2008 Miyamoto et al.
2013/0118647 A1* 5/2013 Berkhout ................ C22C 38/06 148/541
(Continued)

FOREIGN PATENT DOCUMENTS

CN 102275046 A 12/2011
CN 102672332 A 9/2012
(Continued)

OTHER PUBLICATIONS

L. He et al, "Suppression of Liquid Metal Embrittlement in Resistance Spot Welding of TRIP Steel", Jan. 31, 2019; Science and Technology of Welding and Joining (Year: 2019).*
(Continued)

*Primary Examiner* — Ibrahime A Abraham
*Assistant Examiner* — Joseph W Iskra
(74) *Attorney, Agent, or Firm* — Morgan Lewis & Bockius LLP

(57) ABSTRACT

An aspect of the present disclosure is to provide a method for manufacturing a welded structure capable of effectively suppressing welding LME cracks generated during spot welding of a zinc plated steel sheet having ultra-high strength, and a welded structure manufactured using the same.

10 Claims, 6 Drawing Sheets

(51) Int. Cl.

| | |
|---|---|
| ***B23K 11/20*** | (2006.01) |
| ***B23K 35/00*** | (2006.01) |
| ***B23K 35/28*** | (2006.01) |
| ***B23K 101/34*** | (2006.01) |
| ***B23K 103/04*** | (2006.01) |
| ***C22C 21/00*** | (2006.01) |

(52) U.S. Cl.
CPC .......... *B23K 35/001* (2013.01); *B23K 35/288* (2013.01); *C22C 21/00* (2013.01); *B23K 2101/34* (2018.08); *B23K 2103/04* (2018.08)

(58) Field of Classification Search
CPC ......................... B23K 2103/04; B23K 35/001; B23K 35/288; C22C 21/00
USPC ......................................................... 219/91.2
See application file for complete search history.

(56) References Cited

U.S. PATENT DOCUMENTS

| | | | |
|---|---|---|---|
| 2017/0291246 A1* | 10/2017 | Sigler .................... | B23K 11/20 |
| 2017/0297136 A1 | 10/2017 | Brown et al. | |
| 2019/0001428 A1 | 1/2019 | Yang et al. | |
| 2019/0314915 A1 | 10/2019 | Wang et al. | |

FOREIGN PATENT DOCUMENTS

| | | | |
|---|---|---|---|
| CN | 104271789 | * | 1/2015 |
| CN | 109202242 | A | 1/2019 |
| CN | 109352155 | A | 2/2019 |
| CN | 110369845 | A | 10/2019 |
| JP | H05-65623 | A | 3/1993 |
| JP | 2006-265671 | A | 10/2006 |
| JP | 2007-326146 | A | 12/2007 |
| JP | 2016-523718 | A | 8/2016 |
| KR | 10-2008-0089246 | A | 10/2008 |
| KR | 10-2015-0066366 | A | 6/2015 |
| KR | 10-2016-0054111 | A | 5/2016 |
| KR | 10-2018-0007176 | A | 1/2018 |
| KR | 10-1999032 | B1 | 9/2019 |
| WO | 2014/210266 | A1 | 12/2014 |

OTHER PUBLICATIONS

International Search Report dated Feb. 26, 2021 issued in International Patent Application No. PCT/KR2020/016844 (with English translation).
Search Report issued Jun. 2, 2023 for counterpart European Patent Application No. 20895095.6.
Chinese Office Action dated Mar. 12, 2023 issued in Chinese Patent Application No. 202080084626.9.
L. He, et al., "Suppression of liquid metal embrittlement in resistance spot welding of TRIP steel," Science and Technology of Welding and Joining, published on Jan. 31, 2019.

* cited by examiner

[FIG. 1]
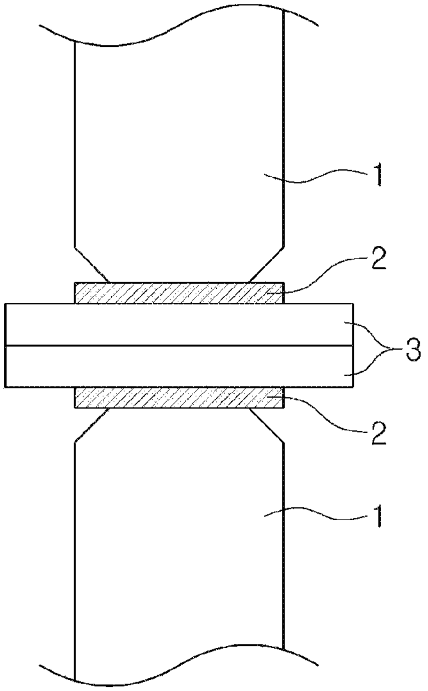

[FIG. 2]
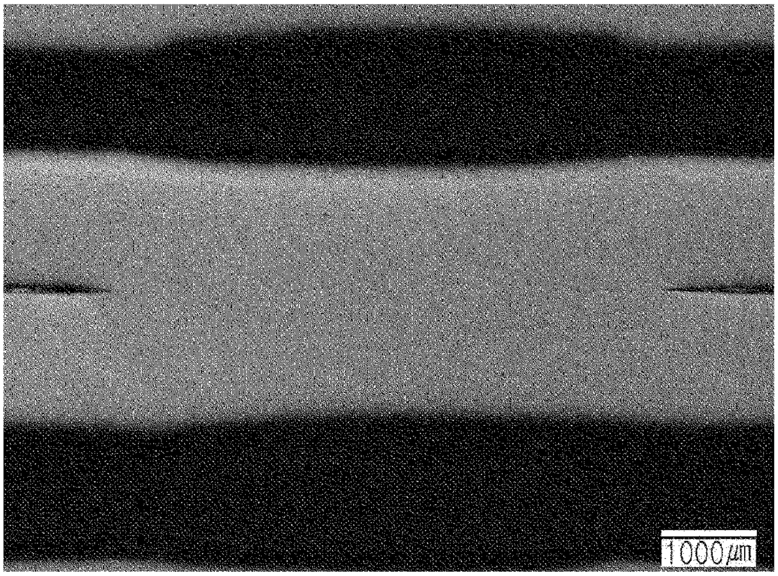

[FIG. 3]
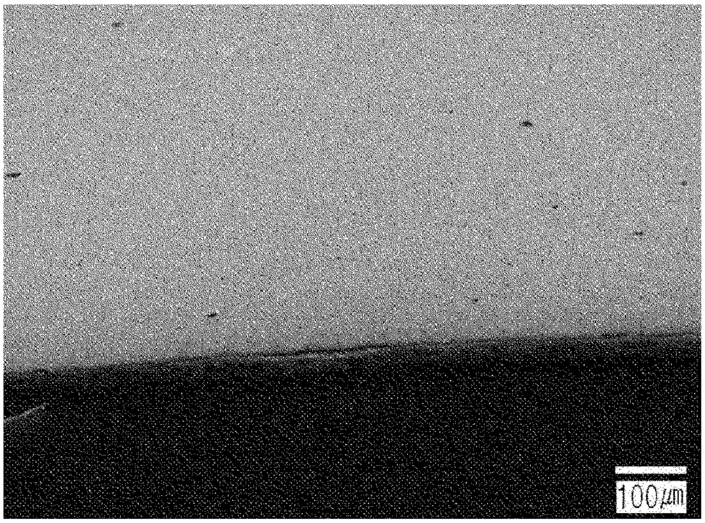

[FIG. 4]
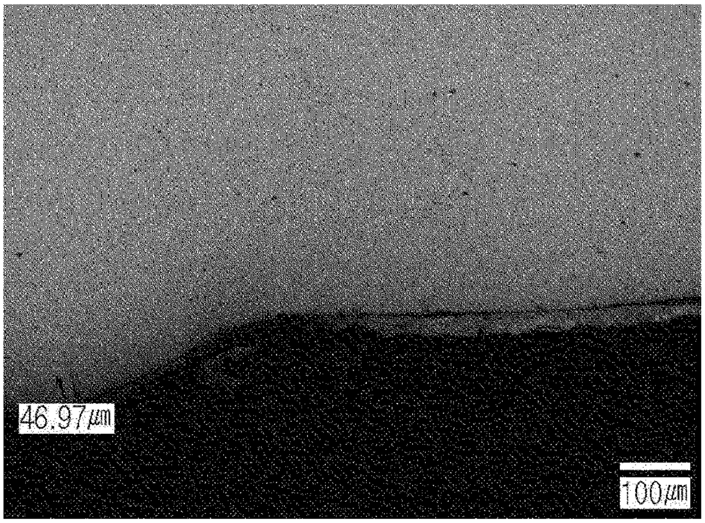

[FIG. 5]
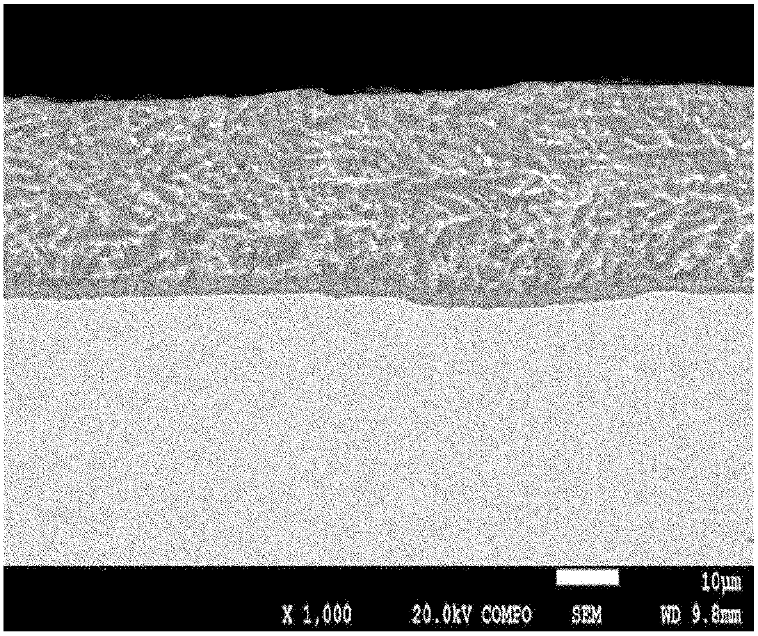

[FIG. 6]
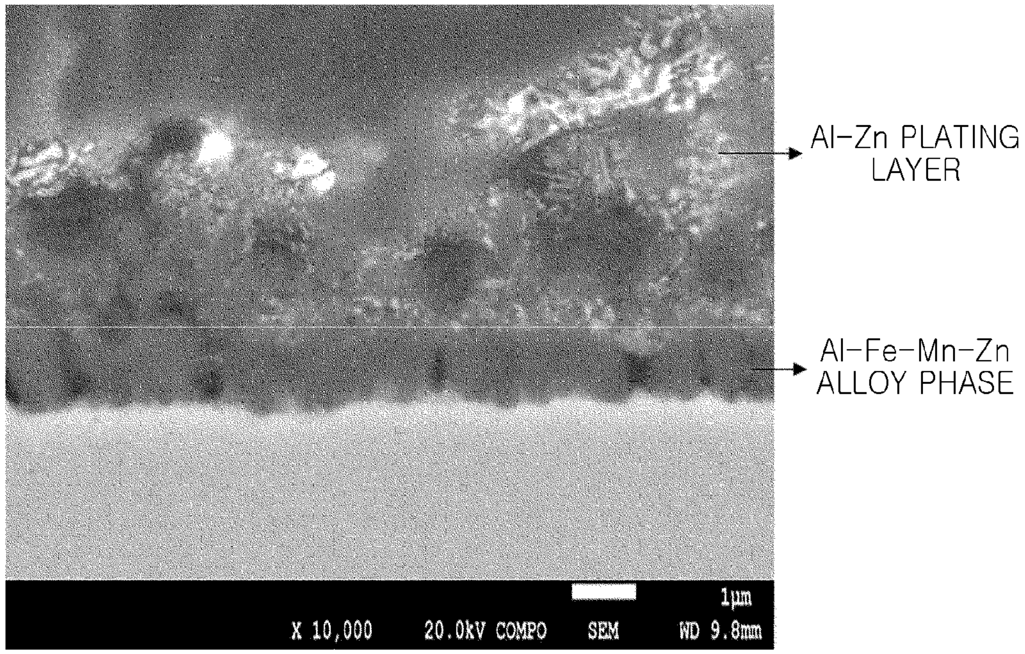

METHOD FOR MANUFACTURING WELDED STRUCTURE, AND WELDED STRUCTURE MANUFACTURED THEREBY

CROSS-REFERENCE OF RELATED APPLICATIONS

This application is the U.S. National Phase under 35 U.S.C. § 371 of International Patent Application No. PCT/KR2020/016844, filed on Nov. 25, 2020, which in turn claims the benefit of Korean Application No. 10-2019-0162009, filed on Dec. 6, 2019, the entire disclosures of which applications are incorporated by reference herein.

TECHNICAL FIELD

The present disclosure relates to a welded structure, and more particularly, to a method for manufacturing a welded structure having excellent spot welding cracking resistance and a welded structure manufactured using the same.

BACKGROUND ART

Twinning induced plasticity steel (hereinafter, also referred to as "TWIP steel") is attracting attention in a high-strength and high-ductility steel sheet for a next-generation vehicle because it has a high strength of 900 MPa and a ductility of 40% or more.

However, in a case of a zinc plated steel sheet using high-manganese and high-aluminum TIWP steel containing a large amount of manganese (Mn) and aluminum (Al) as a base steel sheet, zinc (Zn) in a plating layer is dissolved to become liquid molten zinc in a spot welding process, and the molten zinc penetrates into a grain boundary of a base material. Due to this, cracks may be generated in the base material, causing brittle fracture, so-called welding liquid metal embrittlement (hereinafter, referred to as "LME").

As a method for preventing the occurrence of welding LME as described above, in the related art, a method of dispersing stress through grain size refinement so that Ti, Nb, Mo, and Zr-based precipitates or composite precipitates are dispersed or the like has been proposed; however, there is a limit to suppressing the generation of LME cracks.

RELATED ART DOCUMENT (Patent Document 1) Japanese Patent Laid-Open Publication No. 2006-265671

DISCLOSURE

Technical Problem

An aspect of the present disclosure is to provide a method for manufacturing a welded structure capable of effectively suppressing welding LME cracks generated during spot welding of a zinc plated steel sheet having ultra-high strength, and a welded structure manufactured using the same.

An object of the present disclosure is not limited to the above description. Those skilled in the art to which the present disclosure pertains will have no difficulties in understanding additional objects of the present disclosure from the overall matter in the specification of the present disclosure.

Technical Solution

According to an aspect of the present disclosure, a method for manufacturing a welded structure includes: preparing two or more materials to be welded that are zinc plated steel sheets provided with a base steel sheet and a zinc plating layer formed on at least one surface of the base steel sheet; stacking the materials to be welded on top of each other; positioning a welding rod electrode at a portion to be welded of the material to be welded; and interposing a filler metal between the material to be welded and the welding rod electrode and performing spot welding, wherein alloying between the zinc plating layer and the filler metal proceeds during the spot welding to form an Al—Fe—Zn—Mn intermetallic compound alloy phase at an interface between the zinc plating layer and the base steel sheet, and a total content of Fe and Mn in the Al—Fe—Zn—Mn intermetallic compound alloy phase is 40 to 60 wt %.

According to another aspect of the present disclosure, a welded structure in which two or more materials to be welded are stacked and spot-welded, wherein the material to be welded is a zinc plated steel sheet in which a base steel sheet and a zinc plating layer formed on at least one surface of the base steel sheet are formed, and an Al—Fe—Zn—Mn intermetallic compound alloy phase is included at an interface between the zinc plating layer and the base steel sheet positioned in a weld region, and a total content of Fe and Mn in the Al—Fe—Zn—Mn intermetallic compound alloy phase is 40 to 60 wt %.

Advantageous Effects

As set forth above, according to the present disclosure, a method for manufacturing a welded structure having excellent cracking resistance during spot welding and a welded structure having excellent spot welding cracking resistance that is obtained using the same may be provided.

The various and advantageous advantages and effects of the present disclosure are not limited to the above description, and may be more easily understood in the description of specific exemplary embodiments in the present disclosure.

DESCRIPTION OF DRAWINGS

FIG. 1 illustrates a spot welding method applicable to a method for manufacturing a welded structure according to an exemplary embodiment in the present disclosure.

FIG. 2 is a photograph obtained by observing a cross section of a welded structure manufactured according to an exemplary embodiment in the present disclosure.

FIG. 3 is a photograph obtained by observing a spot welded shoulder portion of Inventive Example 1 with an optical microscope.

FIG. 4 is a photograph obtained by observing a spot welded shoulder portion of Comparative Example 3 with an optical microscope.

FIGS. 5 and 6 illustrate photographs obtained by observing an alloy phase in a plating layer and at a plating layer/base steel sheet interface of Inventive Example 1 with a scanning electron microscope (SEM).

BEST MODE FOR INVENTION

Terminologies used herein are merely used to describe a specific exemplary embodiment, and are not intended to limit the present disclosure. Singular forms used herein include plural forms as long as phrases do not clearly indicate an opposite meaning.

A term "including" used in the present specification concretely indicates specific properties, regions, integer numbers, steps, operations, elements, and/or components, and is not to exclude existence or addition of other specific properties, regions, integer numbers, steps, operations, elements, components, and/or groups.

Unless defined otherwise, all terms including technical terms and scientific terms used herein have the same meanings as understood by those skilled in the art to which the present disclosure pertains. Terms defined in a generally used dictionary are additionally interpreted as having the meaning matched to the related technical document and the currently disclosed contents and are not interpreted as ideal or very formal meanings unless otherwise defined.

The present inventors searched for a method capable of improving cracking resistance during spot welding of a zinc plated steel sheet, and in particular, have intensively studied a method of capable of providing a welded structure having excellent cracking resistance during spot welding.

As a result, the present inventors have found that in a case in which an ultra-high-strength zinc plated steel sheet as a material to be welded is spot-welded, and a filler metal is interposed between the zinc plated steel sheet that is the material to be welded and a welding rod electrode, a melting point of a weld plating layer may be increased by alloying between the plating layer and the filler metal during the welding, and as a result, cracking resistance (welding LME resistance) may be improved, thereby completing the present disclosure.

Hereinafter, a method for manufacturing a welded structure according to an aspect of the present disclosure will be described in detail.

In the present disclosure, it should be noted that the content of each element means wt % unless otherwise specified. In addition, it should be noted that a ratio of crystals and structures is based on an area unless otherwise specified.

A method for manufacturing a welded structure according to an aspect of the present disclosure may include: preparing two or more materials to be welded that are zinc plated steel sheets provided with a base steel sheet and a zinc plating layer formed on at least one surface of the base steel sheet; stacking the materials to be welded on top of each other; positioning a welding rod electrode at a portion to be welded of the material to be welded; and interposing a filler metal between the material to be welded and the welding rod electrode and performing spot welding.

First, two or more zinc plated steel sheets as materials to be welded are prepared, and these steel sheets are stacked on top of each other.

In the present disclosure, the zinc plated steel sheet that is a material to be welded may be a zinc plated steel sheet provided with a base steel sheet and a zinc plating layer formed on at least one surface of the base steel sheet, and the stacking may be performed to include a plating layer formed on the outermost surface (the surface exposed to the outside) when stacking these zinc plated steel sheets.

Here, the base steel sheet is not particularly limited, and as an example, the base steel sheet may be a material in which welding LME cracks are easily generated, that is, TWIP steel containing manganese (Mn) and aluminum (Al) in a total content of 16.5 to 21 wt % in the steel, and the TWIP steel may have ultra-high-strength physical properties. However, the present disclosure is not limited thereto.

The zinc plating layer formed on at least one surface of the base steel sheet may be any plating layer as long as it is obtained by a plating method using zinc (Zn). As an example, the zinc plating layer may be, but is not limited to, any one of an electro-galvanizing layer, a hot-dip galvanizing layer, and a hot-dip galvannealed layer. Furthermore, the zinc plating layer may include a Zn—Al-based alloy plating layer, a Zn—Al—Si-based alloy plating layer, a Zn—Al-REM-based alloy plating layer, or the like as a Zn-based plating layer, but is not limited thereto.

The zinc plating layer needs to have a predetermined thickness or more in order to exhibit resistance to external impact, and the thickness thereof may be 4 to 20 μm.

When the thickness of the zinc plating layer is less than 4 μm, sacrificial anticorrosive properties of zinc may not be sufficiently exhibited when the plating layer is damaged due to external impact, which may intensify corrosion of the base material. Meanwhile, when the thickness thereof exceeds 20 μm, zinc is consumed more than necessary, which causes an increase in manufacturing cost, and the thickness of the plating layer is increased, which causes deterioration of plating surface quality when manufacturing a hot-dip galvanized steel sheet or an electro-galvanized steel sheet.

A thickness of the zinc plated steel sheet having zinc plating layer described above is not particularly limited, and may be within a thickness range of a steel sheet used for an impact structural member among general steel sheets for a vehicle, for example, 1.0 to 1.8 mm.

As described above, the materials to be welded, that is, two or more zinc plated steel sheets are stacked, and a welding rod electrode may be positioned at a portion to be welded.

In general, welding is performed in a state where the portion to be welded and the welding rod electrode are directly in contact with each other, but in the present disclosure, a filler metal is interposed between the portion to be welded and the welding rod electrode, and then, welding is performed.

FIG. 1 illustrates a spot welding method according to an exemplary embodiment in the present disclosure.

Referring to FIG. 1, zinc plated steel sheets 3 as materials to be welded are stacked in several layers, and a welding rod electrode 1 may be positioned at a portion to be welded on each of exposed surfaces on top and bottom of the stacked zinc plated steel sheets 3. In addition, a filler metal 2 may be interposed between the welding rod electrode 1 and the zinc plated steel sheet 3, and a filler metal having a predetermined thickness may be used as the filler metal 2.

The filler metal may be in a form of any one of a foil, a plate, and a wire, and this filler metal may be a pure Al metal.

A thickness of the filler metal may be 40 to 180 μm.

When the thickness of the filler metal is less than 40 μm, even in a case in which the filler metal is alloyed with the zinc plating layer of the zinc plated steel sheet that is a material to be welded, a ratio of zinc in the plating layer is high (Zn-rich), and thus, zinc is partially melted, which may cause generation of welding LME cracks. On the other hand, when the thickness thereof exceeds 180 μm, the zinc plating layer and the filler metal are not sufficiently melted when a current is applied through the welding rod electrode, and thus, a nugget is not sufficiently formed. As a result, it may be difficult to secure welding strength. That is, the current flows through the welding rod electrode in the order of the filler metal, the plating layer, and the base material (Fe) during welding, and in this case, when the thickness of the filler metal is excessively large, the current is not easily transferred to the inside of the base material (Fe), such that a nugget is not easily formed inside the base material. As a result, a nugget may be formed in an excessively small size, or may not be formed.

When the filler metal having the above thickness is interposed between the stacked zinc plated steel sheets that are materials to be welded and the welding rod electrode, a ratio of a thickness of the filler metal (Tf) to a thickness of the zinc plating layer of the zinc plated steel sheet (Tp) may be limited to the following relational expression.

$$5 \leq Tf/Tp \leq 22 \quad \text{[Relational Expression]}$$

Specifically, the ratio of the thickness of the filler metal to the thickness of the zinc plating layer is limited to 5 to 22, and when the thickness ratio is less than 5, the filler metal having a relatively small thickness is interposed, such that zinc permeates into the base material (base steel sheet) in a molten state in an excessive amount than the amount of zinc required for alloying with the zinc plating layer, which may cause LME cracks. On the other hand, when the thickness ratio exceeds 22, although a nugget needs to be formed by resistance heat inside the base material by the current flowing through the filler metal and the zinc plating layer to the base material, a nugget may not be sufficiently formed inside the base material due to a relatively thick filler metal, such that welding may not be performed properly.

When the filler metal is interposed between the stacked zinc plated steel sheets that are materials to be welded and the welding rod electrode to have the above thickness ratio, spot welding may be performed in this state. The spot welding conditions in this case are not particularly limited, and an appropriate level of a current may be applied in consideration of a thickness ratio of the filler metal to the zinc plating layer.

When the spot welding proceeds, alloying between the zinc plating layer and the filler metal proceeds in the welding process by welding heat. Therefore, in the zinc plating layer positioned in the weld region, specifically, at the interface between the zinc plating layer and the base steel sheet, an Al—Fe—Zn—Mn intermetallic compound alloy phase may be formed by Zn in the plating layer, Fe and Mn in the base steel sheet, and Al supplied from the filler metal. Since a melting point of the Al—Fe—Zn—Mn intermetallic compound alloy phase formed as described above is as high as about 1,170 °C, which is a normal temperature of the spot welded shoulder portion, the spot welded shoulder portion is not melted, and thus, welding LME cracks may be effectively suppressed.

A total content of Fe and Mn contained in the Al—Fe—Zn—Mn intermetallic compound alloy phase may be 40 to 60 wt %. When the total content of Fe and Mn in the alloy phase is less than 40 wt %, a dense intermetallic compound alloy phase may not be formed, which may cause deterioration of corrosion resistance and LME cracking resistance. On the other hand, when the total content thereof exceeds 60 wt %, brittleness of the alloy phase is increased, and thus, molten zinc penetrates along cracks generated in the alloy phase, which may cause LME cracks inside the base material.

In addition, a thickness of the Al—Fe—Zn—Mn intermetallic compound alloy phase may be 0.5 to 2.0 μm. When the thickness of the alloy phase is less than 0.5 μm, zinc molten in the spot welding process easily penetrates into the base material, which may cause LME cracks. On the other hand, when the thickness thereof exceeds 2.0 μm, brittleness of the alloy phase is increased, and thus, molten zinc penetrates along cracks generated in the alloy phase, which may cause LME cracks inside the base material.

Furthermore, the Al—Fe—Zn—Mn intermetallic compound alloy phase may be formed at an interval of 0.3 μm or less in a horizontal direction to the zinc plated steel sheet that is a material to be welded.

Next, as another aspect of the present disclosure, a welded structure manufactured by the method for manufacturing a welded structure will be described in detail.

The welded structure manufactured by the manufacturing method of the present disclosure is a welded structure in which two or more materials to be welded are stacked and spot-welded. The two or more materials to be welded may be zinc plated steel sheets provided with a base steel sheet and a zinc plating layer formed on at least one surface of the base steel sheet, and may include an Al—Fe—Zn—Mn intermetallic compound alloy phase in the zinc plating layer positioned in a weld region.

Here, the base steel sheet may be TWIP steel containing Mn and Al in a total content of 16.5 to 21 wt % as described above. The zinc plating layer may also be any one of an electro-galvanizing layer, a hot-dip galvanizing layer, and a hot-dip galvannealed layer as described above, but is not limited thereto.

FIGS. 2 through 6 illustrate photographs of a cross section of the welded structure according to an exemplary embodiment in the present disclosure.

Referring to FIG. 2, the welded structure of the present disclosure may have a structure in which two or more zinc plated steel sheets that are materials to be welded are stacked and spot-welded.

In addition, referring to FIGS. 3 through 6, an Al—Fe—Zn—Mn intermetallic compound alloy phase may be included in the spot-welded region, that is, at an interface between the zinc plating layer and the base steel sheet positioned in the weld region.

The intermetallic compound alloy phase may be formed by alloying between the zinc plating layer of the zinc plated steel sheet that is a material to be welded and the filler metal during spot welding, and the entire filler metal may be alloyed with the zinc plating layer.

The intermetallic compound alloy phase formed by the alloying between the zinc plating layer and the filler metal during spot welding may have a thickness of 0.5 to 2.0 μm, and may be formed at an interval of 0.3 μm or less in a horizontal direction to the zinc plated steel sheet that is a material to be welded.

When the interval of the alloy phase exceeds 0.3 μm, zinc molten in the spot welding process easily penetrates into the base material, which may cause LME cracks.

Since a melting point of the alloy phase is about 1,170 °C, which is higher than a general temperature of a spot welded shoulder portion of about 800 °C, melting of the plating layer at the spot welded shoulder portion may be effectively suppressed during spot welding, and as a result, LME cracking resistance may be efficiently secured.

Mode for Invention

Hereinafter, the present disclosure will be described in more detail with reference to Examples. However, the following Examples are provided to illustrate and describe the present disclosure in detail, but are not intended to limit the scope of the present disclosure. This is because the scope of the present disclosure is determined by contents disclosed in the claims and contents reasonably inferred therefrom.

EXAMPLES

In order to obtain a material to be welded, a slab containing Mn and Al in steel in a total content of 19.75 wt % was prepared, and the slab was subjected to hot-rolling and cold-rolling, thereby manufacturing a cold-rolled steel sheet (TWIP steel) having a thickness of 1.2 mm. At this time, a process condition applied to manufacture a general steel sheet for a vehicle was applied to the hot-rolling and the cold-rolling. This condition corresponds to matters that those skilled in the art may know.

Thereafter, the cold-rolled steel sheet was plated with zinc through an electro-galvanizing process, and at this time, a coating weight was maintained at a level of 60 $g/m^2$.

In order to evaluate spot weldability, two electro-galvanized steel sheets manufactured according to the above were prepared and stacked, and spot welding was performed at a pressing pressure of 2.6 kN under conditions of an energization time of 16 cycles and a holding time of 15 cycles while flowing a welding current using a Cu—Cr electrode having a tip diameter of 6 mm. At this time, a filler metal (a pure Al metal material) having the thickness as shown in Table 1 was interposed between the electro-galvanized steel sheet and the electrode, and then, spot welding was performed. In Comparative Example 3, spot welding was performed without interposing a filler metal.

In the spot welding, a welding current at the time when a blowing phenomenon occurred was set as an upper limit (expulsion current), and the spot welding was performed at a current value lower than the upper limit of the welding current by 0.2 kA.

After completing the spot welding, the center of a weld indentation was cut out, and whether spot welding LME cracks were generated at four points (upper left, lower left, upper right, and lower right) of the spot welded shoulder portion on a cross-sectional structure photograph was observed with an optical microscope (100× magnification). The results thereof are shown in Table 1.

not generated, and a nugget was formed, and as a result, excellent spot welding cracking resistance was exhibited.

On the other hand, in Comparative Examples 1 and 2 in which the thickness ratio with respect to the zinc plating layer was outside of the range suggested by the present disclosure and spot welding was performed in spite of applying the filler metal, although the alloy phase was formed by alloying during the spot welding, a Zn-rich alloy phase was formed, and thus, an LME crack length was excessive as the liquid zinc penetrated into the base material grain boundary in the process in which the temperature of the spot welded shoulder portion was raised to about 800 °C Also, in Comparative Example 3 in which the spot welding was performed without interposing the filler metal, the liquid zinc penetrated into the base material grain boundary during welding, and thus, LME cracking resistance was significantly deteriorated.

Meanwhile, in Comparative Example 4 in which the thickness of the filler metal was excessively large, a nugget was not formed in the base material because the amount of heat input was not sufficient when a current was applied through the welding rod electrode. This means that the welding strength of the weld is deteriorated.

DETAILED DESCRIPTION OF MAIN ELEMENTS

1: welding rod electrode
2: filler metal
3: zinc plated steel sheet

The invention claimed is:

1. A method for manufacturing a welded structure, the method comprising:

TABLE 1

| Classification | Filler metal thickness (μm_Tf) | Zinc plating layer thickness (μm_Tp) | Thickness ratio (Tf/Tp) | Fe + Mn in alloy phase (wt %) | Alloy phase thickness (μm) | LME crack length in shoulder portion (μm) | Whether or not nugget is formed |
|---|---|---|---|---|---|---|---|
| Inventive Example 1 | 60 | 8 | 7.5 | 44.05 | 1.36 | 0 | Formed |
| Inventive Example 2 | 50 | 8 | 6.25 | 42.76 | 1.35 | 0 | Formed |
| Inventive Example 3 | 60 | 6 | 10 | 55.23 | 1.48 | 0 | Formed |
| Inventive Example 4 | 90 | 12.5 | 7.2 | 43.65 | 0.95 | 0 | Formed |
| Inventive Example 5 | 170 | 8 | 21.25 | 48.86 | 0.63 | 0 | Formed |
| Comparative Example 1 | 15 | 8 | 1.88 | 18.77 | 0.23 | 47 | Formed |
| Comparative Example 2 | 35 | 8 | 4.38 | 26.23 | 0.46 | 36 | Formed |
| Comparative Example 3 | 0 | 8 | 0 | 21.75 | 0 | 83 | Formed |
| Comparative Example 4 | 200 | 8 | 25 | 2.62 | 0.72 | 0 | Nonformed |

As shown in Table 1, in Inventive Examples 1 to 5 in which the filler metal having a predetermined thickness was used, and the thickness ratio with respect to the zinc plating layer satisfied as suggested in the present disclosure, and the spot welding was performed, an Al—Fe—Zn—Mn intermetallic compound alloy phase was formed. In particular, the total content of Fe+Mn in the formed alloy phase and the thickness of the alloy phase satisfied as suggested in the present disclosure, such that spot welding LME cracks were preparing two or more materials to be welded that are zinc plated steel sheets;

stacking the materials to be welded on top of each other;

positioning a welding rod electrode at a portion to be welded of the material to be welded; and interposing a filler metal between the material to be welded and the welding rod electrode and performing spot welding, wherein each of the zinc plated steel sheets is comprised of a base steel sheet and a zinc-based plating layer is provided on at least one surface of the base steel sheet, wherein the base steel sheet is TWIP steel containing Mn and Al in a total content of 16.5 to 21 wt %, wherein the filler metal has a thickness of 40 to 180 μm, wherein alloying between the zinc plating layer and the filler metal proceeds during the spot welding to form an Al—Fe—Zn—Mn intermetallic compound alloy phase at an interface between the zinc plating layer and the base steel sheet, and a total content of Fe and Mn in the Al—Fe—Zn—Mn intermetallic compound alloy phase is 40 to 60 wt %.

2. The method for manufacturing a welded structure of claim 1, wherein the Al—Fe—Zn—Mn intermetallic compound alloy phase has a thickness of 0.5 to 2.0 μm, and is formed at an interval of 0.3 μm or less in a horizontal direction to the zinc plated steel sheet.

3. The method for manufacturing a welded structure of claim 1, wherein a ratio of a thickness of the filler metal to a thickness of the galvanizing layer (Tf/Tp) satisfies the following relational expression, in which Tp is the thickness of the zinc plating layer and Tf is the thickness of the filler metal, $$5 \leq Tf/Tp \leq 22. \quad \text{[Relational Expression]}$$

4. The method for manufacturing a welded structure of claim 1, wherein the zinc plating layer has a thickness of 4 to 20 μm.

5. The method for manufacturing a welded structure of claim 1, wherein the filler metal is a pure Al metal.

6. The method for manufacturing a welded structure of claim 1, wherein the filler metal is in a form of any one of a foil, a plate, and a wire.

7. The method for manufacturing a welded structure of claim 1, wherein the zinc plating layer is any one of an electro-galvanizing layer, a hot-dip galvanizing layer, and a hot-dip galvannealed layer.

8. A welded structure in which two or more materials to be welded are stacked and spot-welded, wherein the material to be welded is a zinc plated steel sheet, wherein the zinc plated steel sheet is a base steel sheet and a zinc-based plating layer is provided on at least one surface of the base steel sheet, wherein the base steel sheet is TWIP steel containing Mn and Al in a total content of 16.5 to 21 wt %, and an Al—Fe—Zn—Mn intermetallic compound alloy phase is included at an interface between the zinc plating layer and the base steel sheet positioned in a weld region, and a total content of Fe and Mn in the Al—Fe—Zn—Mn intermetallic compound alloy phase is 40 to 60 wt %.

9. The welded structure of claim 8, wherein the Al—Fe—Zn—Mn intermetallic compound alloy phase has a thickness of 0.5 to 2.0 μm, and is formed at an interval of 0.3 μm or less in a horizontal direction to the zinc plated steel sheet.

10. The welded structure of claim 8, wherein the zinc plating layer is any one of an electro-galvanizing layer, a hot-dip galvanizing layer, and a hot-dip galvannealed layer.

* * * * *